(12) United States Patent
Acriche

(10) Patent No.: US 11,379,892 B2
(45) Date of Patent: Jul. 5, 2022

(54) UTILITY-BASED PRICE GUIDANCE

(71) Applicant: eBay Inc., San Jose, CA (US)

(72) Inventor: Yoni Acriche, Austin, TX (US)

(73) Assignee: EBAY INC., San Jose, CA (US)

( * ) Notice: Subject to any disclaimer, the term of this patent is extended or adjusted under 35 U.S.C. 154(b) by 418 days.

(21) Appl. No.: 15/958,159

(22) Filed: Apr. 20, 2018

(65) Prior Publication Data
US 2019/0325490 A1    Oct. 24, 2019

(51) Int. Cl.
| | | |
|---|---|---|
| *G06Q 30/02* | (2012.01) | |
| *G06Q 30/06* | (2012.01) | |
| *G06F 3/04847* | (2022.01) | |
| *G06Q 50/06* | (2012.01) | |
| *G06N 20/00* | (2019.01) | |

(52) U.S. Cl.
CPC ..... *G06Q 30/0283* (2013.01); *G06F 3/04847* (2013.01); *G06Q 30/0641* (2013.01); *G06N 20/00* (2019.01); *G06Q 50/06* (2013.01)

(58) Field of Classification Search
CPC ............... G06Q 30/02; G06Q 30/0202; G06Q 30/0283; G06Q 30/0201; G06Q 30/0206; G06Q 30/00
See application file for complete search history.

(56) References Cited

U.S. PATENT DOCUMENTS

| | | |
|---|---|---|
| 7,212,998 B1 | 5/2007 | Muller et al. |
| 7,593,871 B1 | 9/2009 | Mesaros |
| 7,945,509 B1 | 5/2011 | Chatter et al. |
| 8,326,662 B1 | 12/2012 | Byrne et al. |
| 8,612,314 B2 | 12/2013 | Swinson et al. |
| 8,676,631 B2 | 3/2014 | Basak et al. |

(Continued)

FOREIGN PATENT DOCUMENTS

| | | |
|---|---|---|
| WO | 2004/107237 A1 | 12/2004 |
| WO | 2019/204374 A1 | 10/2019 |

OTHER PUBLICATIONS

Tereyagoglu, N. (2012). Analysis of operational strategies driven by customer analytics: Models and empirics (3542847). Available from ProQuest Dissertations and Theses Professional. (1153255762). Retrieved from https://dialog.proquest.com/professional/docview/1153255762?accountid=131444 (Year: 2012).*

(Continued)

*Primary Examiner* — Michael P Harrington
(74) *Attorney, Agent, or Firm* — Schwegman Lundberg & Woessner, P.A.

(57) ABSTRACT

Based on an analysis of historical data of listings for an item, an online marketplace generates a price curve for the item to describe the likelihood to sell as a function of price. Based on seller preference data, an analysis of historical data of listings, or both, the online marketplace estimates the utility preferences for the seller account, such as the cost of time. Using the utility preferences and the price curve for an item, the online marketplace can generate a utility curve that estimates the utility for the seller account as a function of the item price. Using the utility curve, the online marketplace generates utility-based price guidance for a particular seller of the item. A user interface presents the utility-based price guidance to the seller and enables the seller to set the price of the item based on the price guidance.

13 Claims, 12 Drawing Sheets

(56) References Cited

U.S. PATENT DOCUMENTS

| | | | |
|---|---|---|---|
| 10,339,548 B1* | 7/2019 | Kumar | G06Q 30/0206 |
| 2002/0026429 A1 | 2/2002 | Lostis et al. | |
| 2007/0239632 A1* | 10/2007 | Burges | G06N 20/00 |
| | | | 706/15 |
| 2009/0164383 A1* | 6/2009 | Rothman | G06Q 50/188 |
| | | | 705/80 |
| 2010/0312665 A1 | 12/2010 | Bundy | |
| 2011/0004509 A1 | 1/2011 | Wu et al. | |
| 2011/0184806 A1 | 7/2011 | Chen et al. | |
| 2013/0346157 A1* | 12/2013 | Avrilionis | G06Q 30/0206 |
| | | | 705/7.35 |
| 2015/0161635 A1 | 6/2015 | Yuan et al. | |
| 2019/0272557 A1* | 9/2019 | Smith | G06F 17/18 |
| 2020/0380543 A1* | 12/2020 | Surkont | G06Q 30/0202 |

OTHER PUBLICATIONS

International Search Report received for PCT Application No. PCT/US2019/027784, dated May 28, 2019, 3 pages.
International Written Opinion received for PCT Application No. PCT/US2019/027784, dated May 28, 2019, 6 pages.
International Preliminary Report on Patentability received for Application No. PCT/US2019/027784, dated Oct. 29, 2020, 8 pages.

* cited by examiner

800

ITEM HISTORY TABLE — 810

| ITEM ID | SELLER ID | PRICE | DATE | SOLD |
|---|---|---|---|---|
| 1 | 101 | $24.00 | 1/2/17 | TRUE |
| 1 | 102 | $35.00 | 3/1/17 | TRUE |
| 2 | 103 | $99.00 | 3/5/17 | FALSE |

SELLER PREFERENCES TABLE — 840

| SELLER ID | PREFERRED TIME TO SELL | TOL. FOR UNSOLD |
|---|---|---|
| 101 | 0 | 0% |
| 102 | 7 DAYS | 10% |
| 103 | 30 DAYS | 75% |

*FIG. 8*

UTILITY-BASED PRICE GUIDANCE

TECHNICAL FIELD

The subject matter disclosed herein generally relates to the processing of data. Specifically, in some example embodiments, the present disclosure addresses systems and methods for generating price guidance to a seller of an item based on a utility curve for the seller.

BRIEF DESCRIPTION OF THE DRAWINGS

Some embodiments are illustrated by way of example and not limitation in the figures of the accompanying drawings.

FIG. 8 is a block diagram illustrating a database schema suitable for utility-based price guidance, according to some example embodiments.

DETAILED DESCRIPTION

Example methods and systems are directed to utility-based price guidance. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A user of an online marketplace may generate a listing for an item for sale from an account of the user via the online marketplace (e.g., a seller account). The item name and description may be selected from a database of known items or entered by the user. Different users may select different prices for the same item. For example, a business that needs to maintain a certain profit margin on items sold may set a higher price for an item than an individual that wants to sell an item quickly.

Based on analysis of historical data of listings, the online marketplace generates a price curve for an item. Using the price curve, the online marketplace can estimate a probability of sale for the item and an average time to sell for the item, both as a function of price.

Based on seller preference data, an analysis of historical data of listings, or both, the online marketplace estimates the utility preferences for the seller account. Using the utility preferences and the price curve for an item, the online marketplace can generate a utility curve that estimates the utility for the seller account as a function of item price.

By considering the utility curve, the online marketplace generates utility-based price guidance for a particular seller of the item. A user interface presents the utility-based price guidance to the seller and enables the seller to set the price of the item based on the price guidance.

Figure 1:
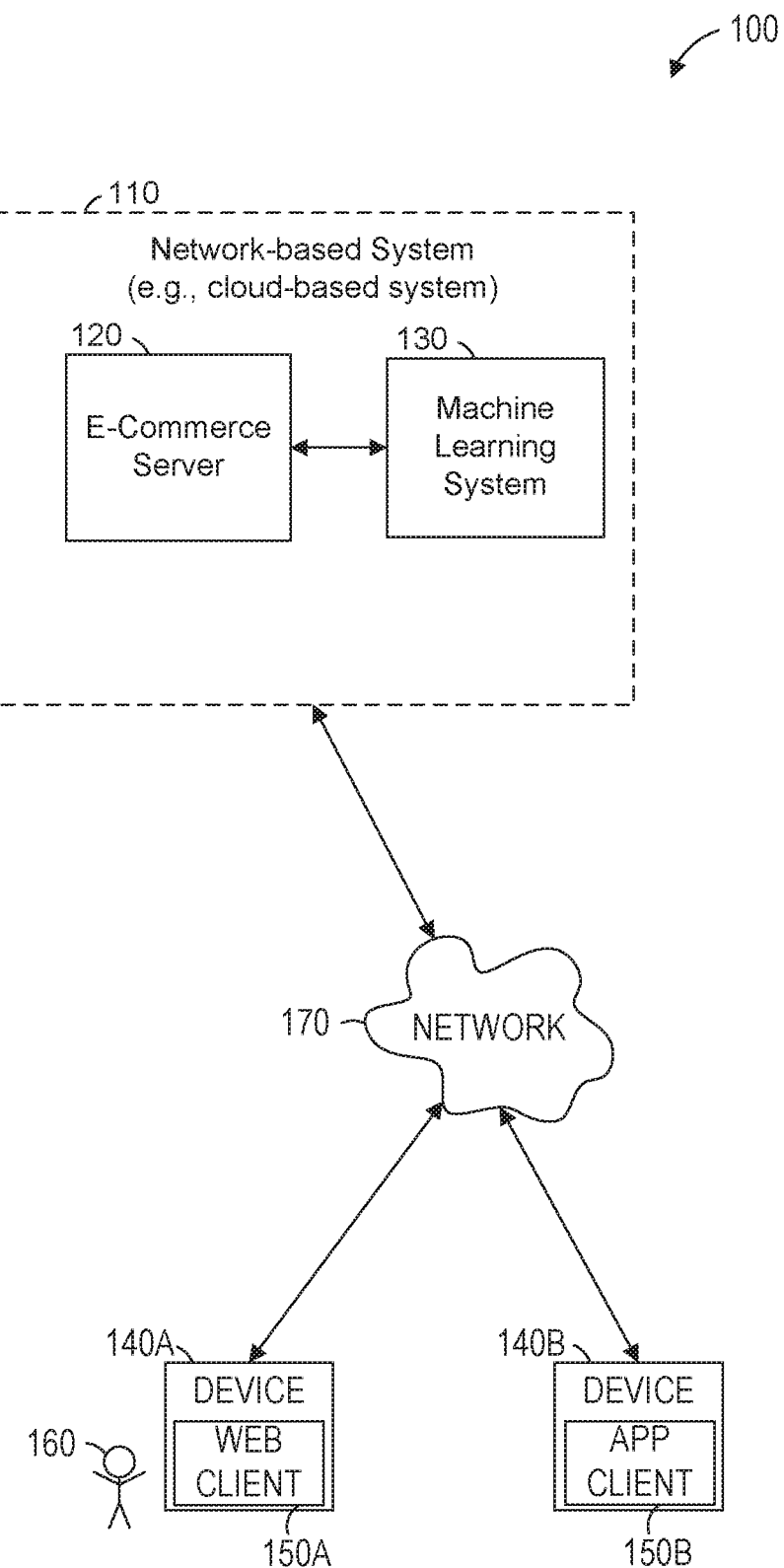
FIG. 1 is a network diagram illustrating a network environment suitable for utility-based price guidance, according to some example embodiments.

FIG. 1 is a network diagram illustrating a network environment 100 suitable for utility-based price guidance, according to some example embodiments. The network environment 100 includes a network-based system 110, device 140A, and device 140B, all communicatively coupled to each other via a network 170. The devices 140A and 140B may be collectively referred to as "devices 140," or generically referred to as a "device 140." The network-based system 110 comprises an e-commerce server 120 and a machine learning system 130. The devices 140 may interact with the network-based system 110 using a web client 150A or an app client 150B. The e-commerce server 120, the machine learning system 130, and the devices 140 may each be implemented in a computer system, in whole or in part, as described below with respect to FIGS. 11-12.

The e-commerce server 120 provides an electronic commerce application to other machines (e.g., the devices 140) via the network 170. The electronic commerce application may provide a way for users to buy and sell items directly from and to each other, to buy from and sell to the electronic commerce application provider, or both. An item listing describes an item that can be purchased. For example, a user may create an item listing that describes an item owned by the user that may be purchased by another user via the e-commerce server 120. Item listings include text, one or more images, or both.

The machine learning system 130 may access listing data from the e-commerce machine 120 and use the accessed data as training data for one or more machine learning algorithms. For example, one machine learning algorithm may be used to predict when a listing of an item will sell, based on the item and a listed price of the item. As another example, a machine learning algorithm may be used to predict, for a particular seller, a preferred listing duration (i.e., a preferred time-to-sell for items).

Also shown in FIG. 1 is a user 160. The user 160 may be a human user (e.g., a human being), a machine user (e.g., a computer configured by a software program to interact with the devices 140 and the e-commerce server 120), or any suitable combination thereof (e.g., a human assisted by a machine or a machine supervised by a human). The user 160 is not part of the network environment 100, but is associated with the devices 140 and may be a user of the devices 140 (e.g., an owner of the devices 140A and 140B). For example, the device 140 may be a desktop computer, a vehicle computer, a tablet computer, a navigational device, a portable media device, or a smart phone belonging to the user 160.

In some example embodiments, the e-commerce server 120 receives information from the user 160 for an item being listed for sale by the user 160. The information may include a price for the item. Based on information received from the machine learning system 130, the e-commerce server 120 may cause a user interface that includes price guidance to be presented to the user 160. The price guidance may indicate a recommended price for the item, with the recommended price being based on a predicted utility for the seller.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 11-12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 170 may be any network that enables communication between or among machines, databases, and devices (e.g., the e-commerce server 120 and the devices 140). Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
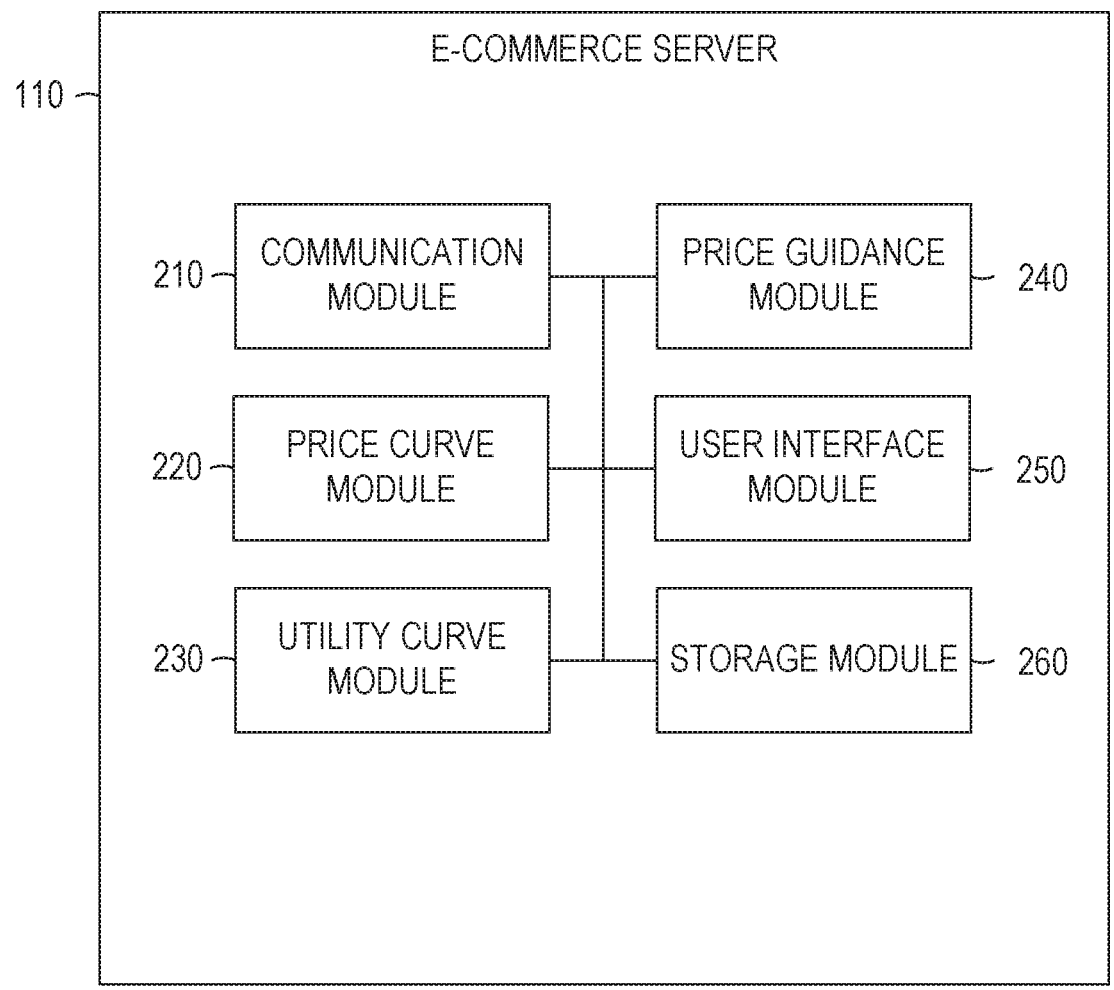
FIG. 2 is a block diagram illustrating components of an e-commerce server suitable for utility-based price guidance, according to some example embodiments.

FIG. 2 is a block diagram illustrating components of the e-commerce server 120, according to some example embodiments. The e-commerce server 120 is shown as including a communication module 210, a price curve module 220, a utility curve module 230, a price guidance module 240, a user interface module 250, and a storage module 260, all configured to communicate with each other (e.g., via a bus, shared memory, a switch, or application programming interfaces (APIs)). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 is configured to send and receive data. For example, the communication module 210 may receive, over the network 170, information for listing an item for sale by a user and send the received data to the storage module 260 for later access by the price guidance module 240, the user interface module 250, or both. The communication module 210 may also send information to the machine learning system 130 for use in training one or more machine learning algorithms and receive information from the machine learning system 130 for use in providing price guidance.

The price curve module 220 is configured to generate a price curve for items based on historical listing data. For example, the creation date of each listing, the close date of each listing, the price of the item in each listing, whether the listed item sold or was unsold, the country of the listing, the promotional features of the listing, the shipping cost of the listing, the shipping method of the listing, the market demand for the listed item at the time of creation of the listing, the market supply for the listed item at the time of creation of the listing, a price for the listed item by a competitor, a condition of the item (e.g., new or used), or any suitable combination thereof), or any suitable combination thereof may be used as inputs for the generation of the price curve for the item.

In some example embodiments, historical listing data for the same item (e.g., the same DVD, book, or product) is used to generate the price curve for an item being listed by a seller account. In other example embodiments, the item being listed by a seller account is described by a vector of attributes (e.g., with one attribute in the vector for one or more of the inputs listed above). The price curve for the item may be generated using historical listing data for other items, each described by a vector of attributes, having a distance measure below a predetermined threshold.

The utility curve module 230 is configured to generate a utility curve for seller accounts based on preference data for each seller account. The preference data for a seller account may be generated based on historical listing data of items listed for sale by the seller account. For example, the creation date of each listing, the close date of each listing, the price of the item in each listing, whether the listed item sold or was unsold, the country of the listing, promotional features of the listing, the price curve for the listed item, or any suitable combination thereof may be used as inputs for the generation of the preference data for the seller account. The preference data may also be generated based on information provided by the user in response to prompts. For example, the user may be asked to set a preference for the seller account, the preference indicating the user's relative preference for selling items quickly versus maximizing the price of each item sold.

In some example embodiments, the preference data for the seller account is based on an intermediate determination as to whether the seller account is a consumer account or a business account. For example, a machine learning algorithm may be trained on historical listing data to classify a seller account as either a consumer account or a business account based on historical listing data for items sold by the seller account. Predetermined preferences for selling items quickly versus maximizing the price of each item sold may be used for the seller account based on the determination of which type of account the seller account is.

The price guidance module 240 is configured to generate price guidance for users, with the price guidance comprising a price recommendation for a particular item being sold by a particular seller. The price guidance is generated based on the utility curve for the seller and the price curve for the item.

The user interface module 250 is configured to provide a user interface for generating listings of items for sale, accepting or modifying price guidance, or any suitable combination thereof. For example, a user interface 700 (described below with respect to FIG. 7) may be presented by the user interface module 250, and selections may be received via an application interface or a web interface. The storage module 260 is configured to store data regarding items, listings, users, or any suitable combination thereof. In some example embodiments, the user interface module 250 causes presentation of a user interface comprising a prompt to provide a preference for the seller account (e.g., a preference for a cost of time, a preference for a tolerance for listings that do not result in sales, a preference for an average time to sell, or any suitable combination thereof) and the preference is received via the presented user interface.

Figure 3:
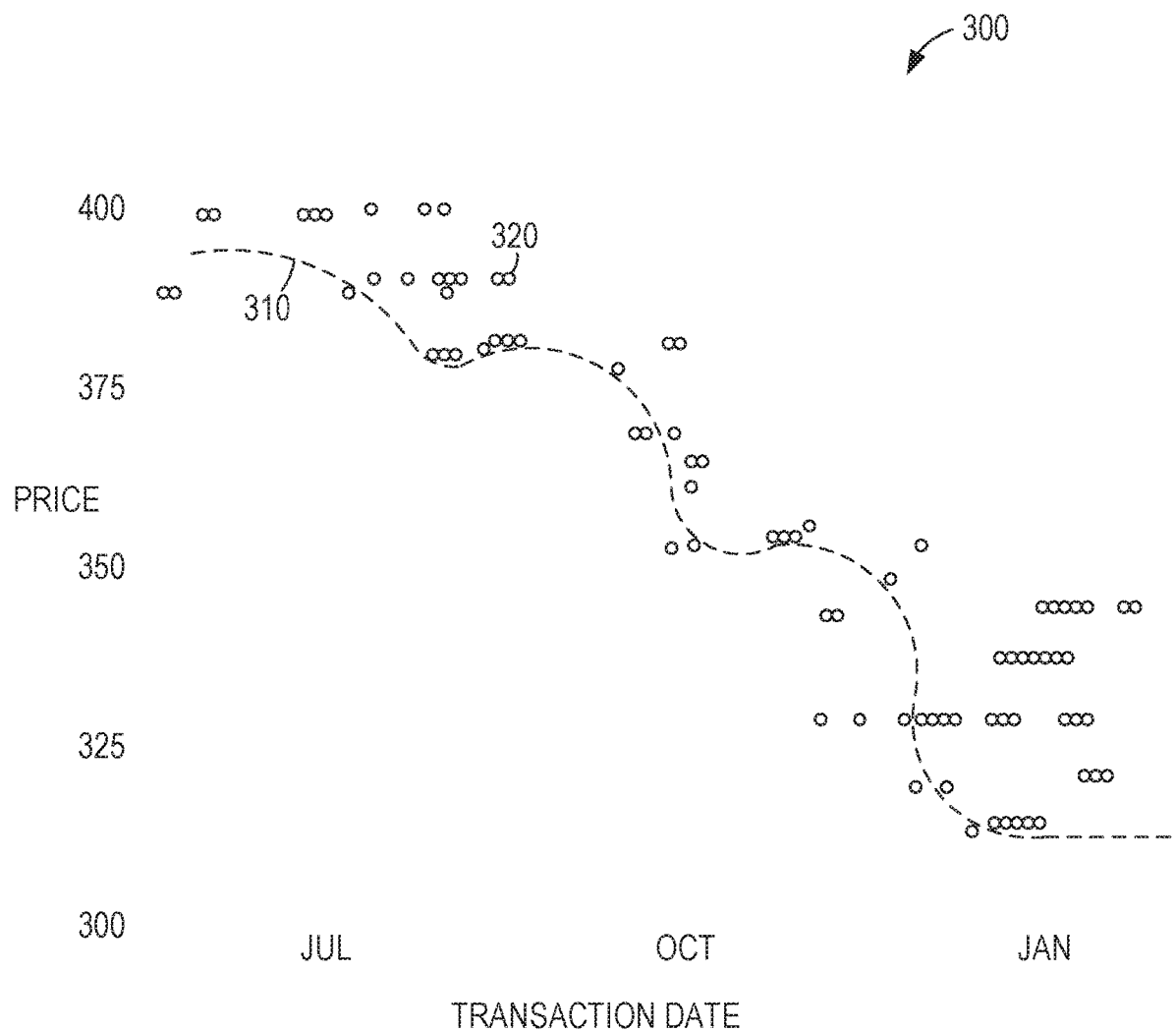
FIG. 3 is a graph illustrating an example price trend curve, according to some example embodiments.

FIG. 3 is a graph 300 illustrating an example price trend curve 310, according to some example embodiments. The graph 300 shows individual transactions 320 for a particular item (e.g., an Xbox One console) as circles, with each circle indicating the price and transaction date of the transaction. The price trend curve 310 is generated from the individual transactions 320, and indicates an overall pattern of transaction prices for the particular item. The price trend curve 310 may be generated from the individual transactions 320 using regression analysis.

Figure 4:
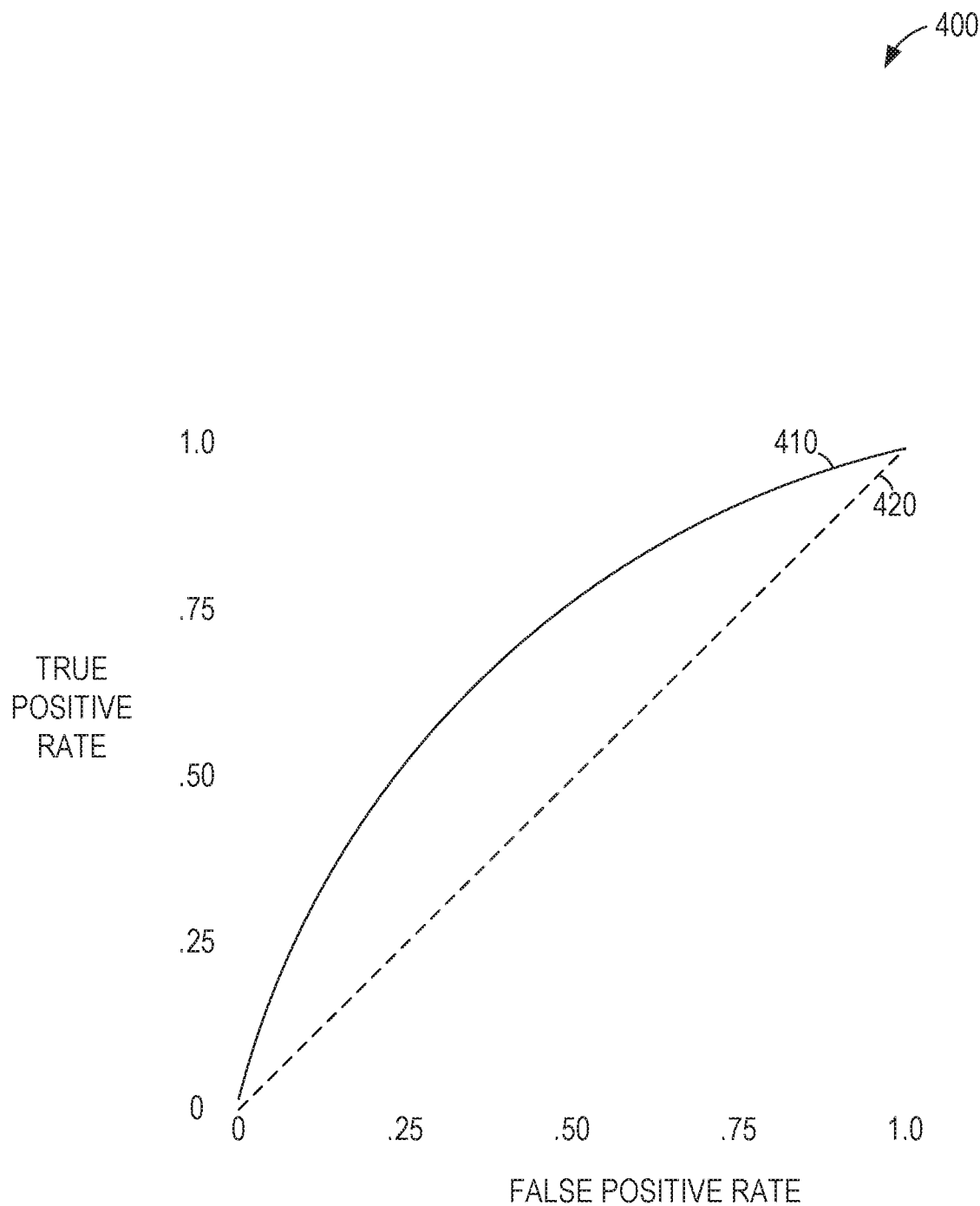
FIG. 4 is a graph illustrating an example receiver operating characteristic curve, according to some example embodiments.

FIG. 4 is a graph 400 illustrating an example receiver operating characteristic (ROC) curve 410, according to some example embodiments. Also shown is reference curve 420. A ROC curve shows the true positive rate as a function of the false positive rate. A classification model (e.g., a machine-learning algorithm that takes data as input and generates a classification of the input data as an output) generates a true positive result by correctly identifying an input as being a member of a class and generates a true negative result by correctly identifying an input as not being a member of the class. A classification model generates a false positive result by incorrectly identifying an input as being a member of a class and generates a false negative result by incorrectly identifying an input as not being a member of the class.

A perfect classifier would correctly identify every member of the class, and thus have a true positive rate of 100%, while also correctly identifying every non-member of the class, thus having a false positive rate of 0%. A random classifier would identify input data as being members of the class with a constant percentage, without regard to whether the input was actually a member of the class. Accordingly, a random classifier would have a true positive rate equal to the false positive rate, resulting in the reference curve 420. The degree to which the ROC curve for a classifier is above the reference curve 420 is a measure of the superiority of the quality of the classifier to random guessing. Thus, for a set of classifiers, the classifier having the larger area under the ROC (AUROC) may be considered to be better. Accordingly, changes to a machine-learning algorithm that increase AUROC may be encouraged (e.g., bred for in a genetic programming environment or selected in a gradient descent environment) while changes that decrease AUROC may be discouraged (e.g., selected against in a genetic programming environment or avoided in a gradient descent environment).

Figure 5:
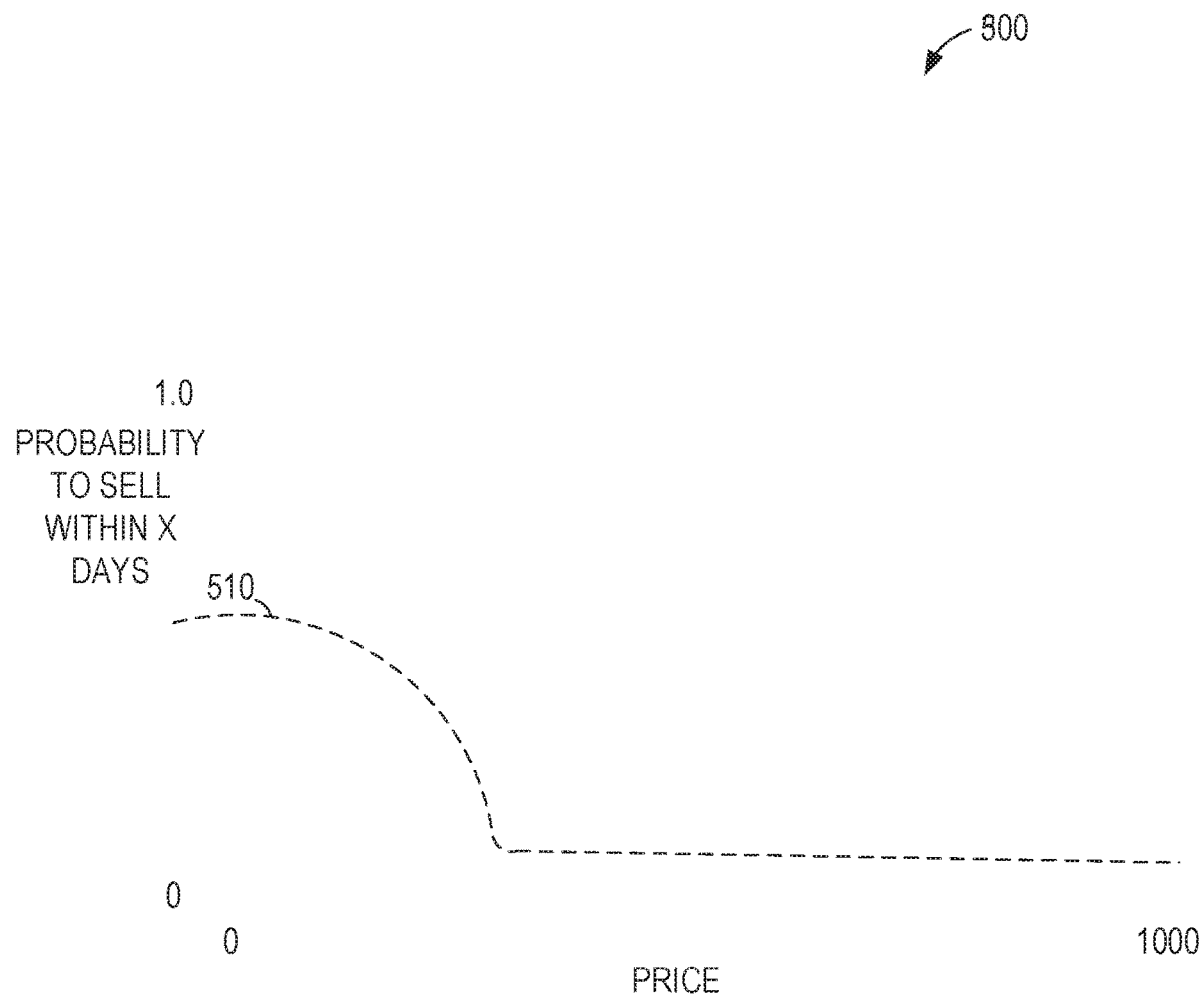
FIG. 5 is a graph illustrating an example price curve, according to some example embodiments.

FIG. 5 is a graph 500 illustrating an example price curve 510, according to some example embodiments. The price curve 510 shows the probability of selling a particular item within a predetermined period of time (e.g., one day, one week, or one month) as a function of price. When the price greatly exceeds the market price, the probability of sale approaches zero. When the price is near or below the market price, the probability of sale is maximized. The price curve 510 may be generated by analysis of historical listing data. For example, every listing for the item within a preceding time period (e.g., one week, one month, or one year) may be considered. If a considered listing resulted in a sale within the predetermined period of time, the listing increases the probability of sale at the price for the considered listing. If a considered listing did not result in a sale within the predetermined period of time, the listing decreases the probability of sale at the price for the considered listing. By aggregating the data, the price curve 510 may be generated (e.g., using regression analysis).

Figure 6:
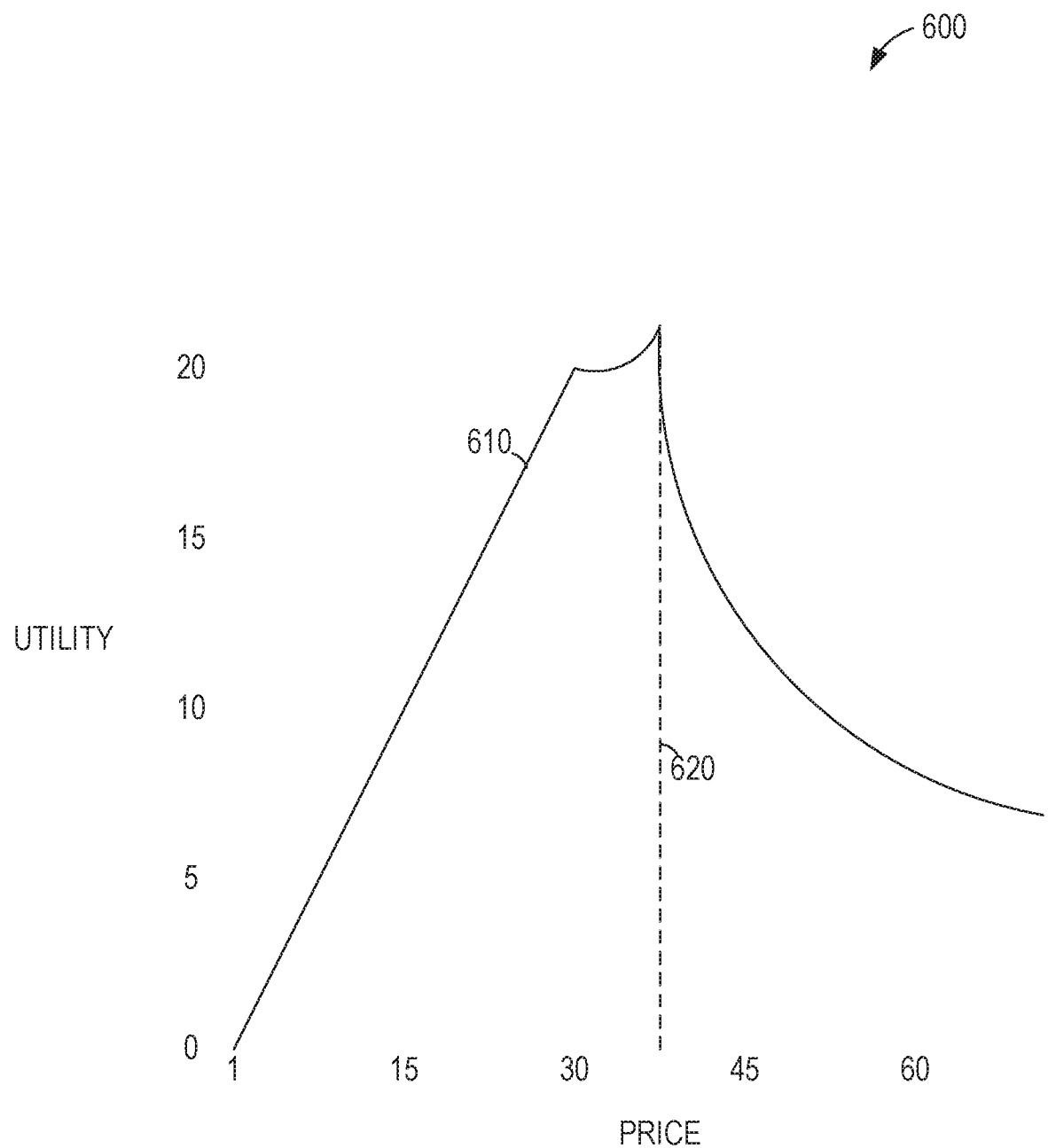
FIG. 6 is a graph illustrating an example utility curve, according to some example embodiments.

FIG. 6 is a graph 600 illustrating an example utility curve 610, according to some example embodiments. Also shown is line 620, indicating the price that corresponds to the maximum value of the utility curve 610. The utility curve 610 shows the utility to a particular seller of listing an item for sale as a function of the listing price. As can be seen in FIG. 6, the utility curve 610 includes a portion that linearly increases with price until the price reaches a threshold price. In this portion of the curve, substantially below the market price of the item, the probability of sale of the item within a predetermined period of time is constant, and thus the value of the listing directly depends on the price chosen. Above a second threshold price, the conflicting factors of a higher price (increasing utility) and a lower probability of sale (reducing utility) result in a curve that asymptotically approaches zero as the price increases. Between the two thresholds, the likelihood of sale is high, but the expected time to sell varies. As a result, the utility curve will be different for different sellers, depending on the relative utility of a particular seller of selling more quickly or obtaining a higher price. In the example utility curve 610, the price that generates the maximum utility is at the second threshold, suggesting that this seller prefers to get a higher price for the item even if it means waiting longer for a sale.

Figure 7:
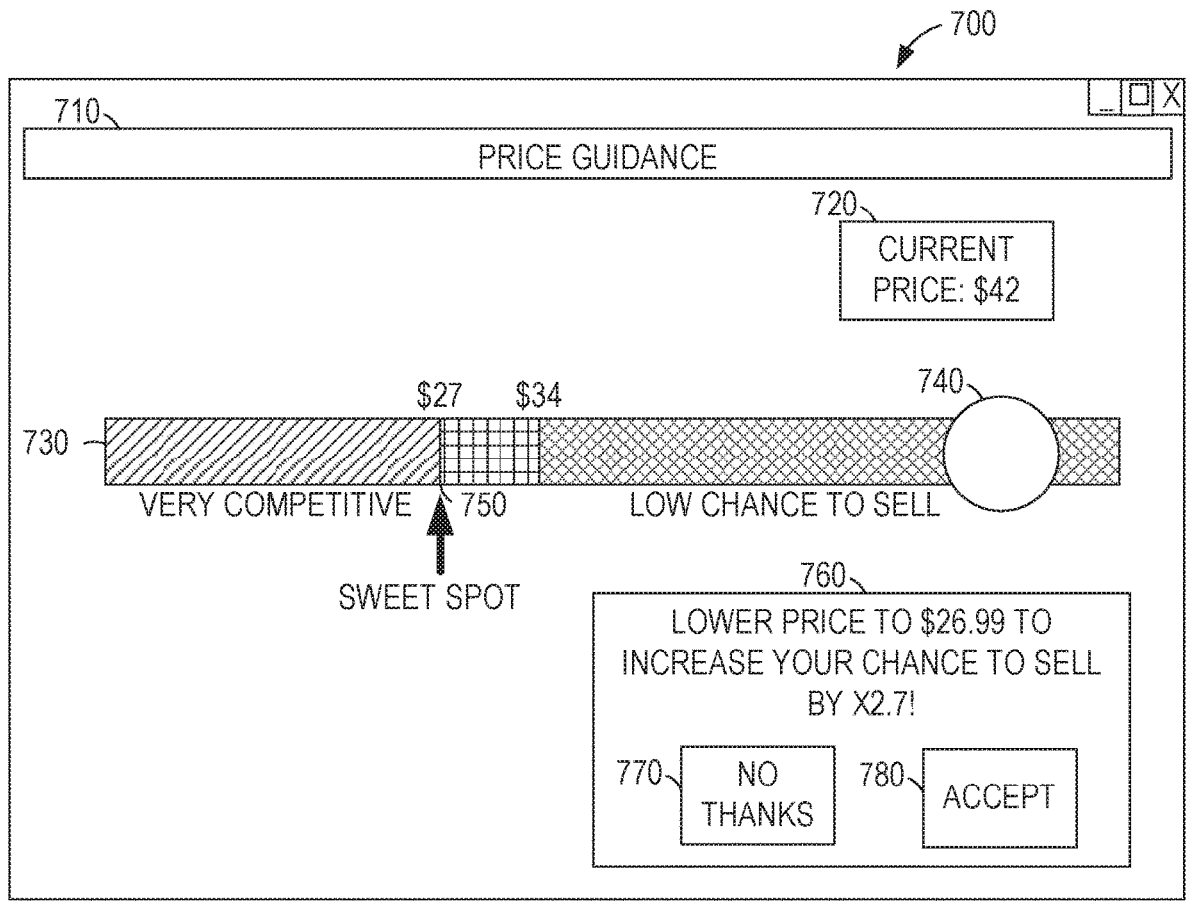
FIG. 7 is a block diagram illustrating a user interface suitable for utility-based price guidance, according to some example embodiments.

FIG. 7 is a block diagram illustrating a user interface 700 suitable for utility-based price guidance, according to some example embodiments. The user interface 700 includes a title 710, a current price 720, a price slider 730 including a price control 740 and a recommended price indicator 750, and a control area 760 including buttons 770 and 780. The user interface 700 may be displayed in response to a user listing an item for sale from a seller account. The title 710 displays a title for the user interface 700.

The current price 720 shows the current price for the listing (e.g., a fixed buy-it-now price or a starting auction price). The price control 740 is initially displayed at a position corresponding to the current price 720 (e.g., $42). The recommended price indicator indicates a position on the price slider 730 corresponding to a recommended price. The recommended price may be the price that is predicted to maximize utility for the seller account (e.g., as indicated by the line 620 intersecting the utility curve 610). The price slider 730 may be divided visually into multiple regions, each region corresponding to a portion of a utility curve. In FIG. 7, the price slider 730 is divided into three regions: a low price region in which the item is likely to sell quickly, labeled "Very Competitive," a high price region in which the item may not sell at all, labeled "Low Chance To Sell," and an intermediate region, in which price variations are more likely to affect time to sell than whether the item eventually sells. In FIG. 7, the recommended price indicator 750 suggests a price at the lowest price of the intermediate region, indicating that the utility curve for this seller account shows a preference for quick sales over maximizing revenue per sale. For other seller accounts, the recommended price indicator 750 may be at a different position, depending on the utility curve for the particular seller account.

The control area 760 may include an indication of the recommended price and a reason for the recommendation. In the example of FIG. 7, the reason for the recommendation is that a listing for the item at $26.99 is 2.7 times more likely to sell than a listing for the item at the current price of $42.00. The button 780 is operable to accept the recommended price. The button 770 is operable to reject the recommended price. Operation of either button may cause the listing to be completed and presented to buyers on the e-commerce site. The price control 740 may be operable (e.g., by clicking and dragging, touching and dragging, selecting and moving using arrow keys, or any suitable combination thereof) by the user to indicate another selected price. For example, the user may reject the price guidance of $26.99, but still choose to lower the price (e.g., to $34.00, the highest price of the intermediate portion of the price slider). In some example embodiments, the control area 760 is updated to reflect the price corresponding to the position of the price control 740. For example, if the user places the control at $34, the text portion of the control area 760 may change to "Lower price to $34.00 to increase your chance to sell by X1.9!" In this example, operation of the button 780 may cause the listing to be completed at the selected price of $34 instead of the recommended price of $27.99 or the original price of $42.

FIG. 8 is a block diagram illustrating a database schema 800 suitable for utility-based price guidance, according to some example embodiments. The database schema 800 includes an item history table 810 and a seller preferences table 840. The item history table 810 is defined by a table definition 820, including an item identifier field, a seller identifier field, a price field, a date field, and a sold field, and includes rows 830A, 830B, and 830C. The seller preferences table 840 is defined by a table definition 850, including a seller identifier field, a preferred time to sell field, and a tolerance for unsold items field, and includes rows 860A, 860B, and 860C.

Each of the rows 830A-830C stores information for a completed item listing. The item identifier field identifies the listed item. The seller identifier field identifies the seller of the item. The price field identifies the price at which the item was listed or sold. The date field identifies the date at which the listing was completed (either by closing the listing or by selling the item). The sold field indicates whether the listed item was sold or not. Thus, the rows 830A and 830B were for the same item (e.g., identical copies of a DVD), by different sellers. Both listings resulted in sales, but the Mar. 1, 2017 listing resulted in a sale at $35 and the Jan. 2, 2017 listing resulted in a sale at $24. The row 820C is for a listing of a different item, listed at $99 and not sold at that price.

Each of the rows 860A-860C stores information for preferences for a seller account. The seller identifier field indicates the seller account to which the preferences apply. The preferred time to sell field indicates a duration of time that the seller prefers to have listings remain open. A shorter duration of time indicates a preference to sell quickly, even if that results in a lower price. A longer duration of time indicates a willingness to wait for a sale at a premium price. The tolerance for unsold field indicates the percentage of unsold items the seller account is willing to tolerate in waiting for a buyer at the right price. The row 860A indicates 0% tolerance for unsold: this seller account wants to sell every item without needing to relist. The row 860C indicates a 75% tolerance for unsold: this seller account is willing to relist 75% of items to attempt to secure the best price for each item.

Figure 9:
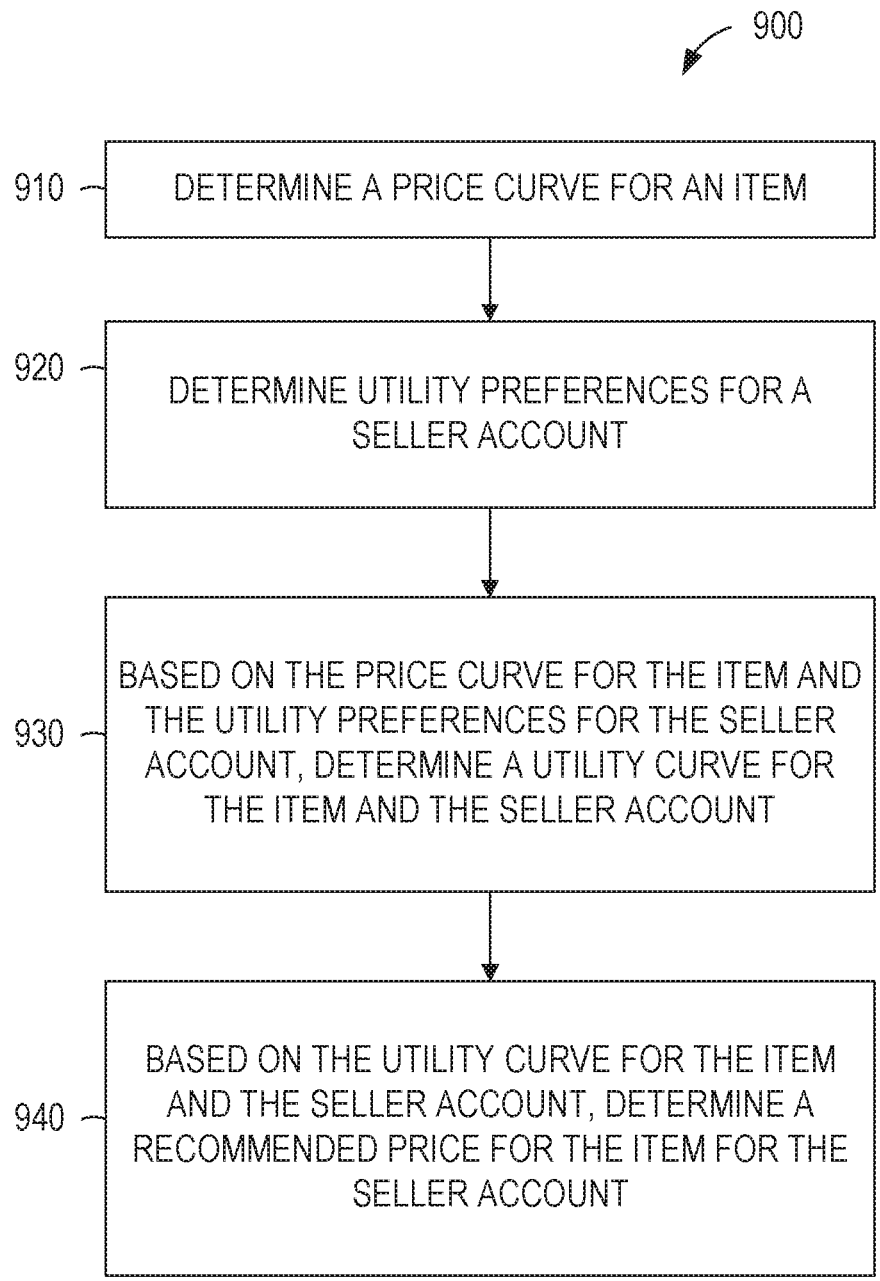
FIG. 9 is a flowchart illustrating operations of a computing device in performing a method of utility-based price guidance, according to some example embodiments.

FIG. 9 is a flowchart illustrating operations of a computing device in performing a method 900 of utility-based price guidance, according to some example embodiments. The method 900 includes operations 910, 920, 930, and 940. By way of example and not limitation, the method 900 is described as being performed by the systems of FIG. 1 and the modules of FIG. 2.

In operation 910, the price curve module 220 determines a price curve for an item. For example, based on historical transaction data such as the data shown in the graph 300 and stored in the item history table 810, a price curve similar to the price curve 510 may be generated, giving a predicted probability of the item to sell within a predetermined period of time as a function of price. In some example embodiments, multiple price curves are generated, with each curve being for a different predetermined period of time (e.g., one curve for a probability to sell within one day, one curve for a probability to sell within three days, one curve for a probability to sell within seven days, and so on).

In operation 920, the utility curve module 230 determines utility preferences for a seller account. For example, based on data in the item history table 810, the price at which items sold by the seller account are sold can be compared to the prices at which the same items are sold by other seller accounts to determine whether the seller account more frequently sells items at, above, or below market price. As another example, the time elapsed between the generating of each listing by the seller account and the sale of the item may be used to estimate a preferred time to sell for the seller account. Similarly, the frequency at which items listed by the seller account do not sell can be determined and used as an estimate for a tolerance for unsold items for the seller account. Alternatively or additionally, preferences set for the seller account by a user may be used. For example, a user interface may be presented that allows a user to input values stored in the seller preferences table 840.

In operation 930, the utility curve module 230 determines a utility curve for the item and the seller account, based on the price curve for the item and the utility preferences for the seller account. For example, the utility curve 610 may be generated using a machine learning algorithm. Alternatively, the utility curve 610 may be generated by the equation:

$$U(\text{price},\text{seller}) = P(\text{price},\text{seller})^{T(\text{seller})} \times \log(\text{price})$$

In the equation above, U is the utility for a particular price and seller account; P is the probability of sale within the preferred time to sell for the seller account; and T is the time cost for the seller account. Thus, when P is equal to or very close to 1 (indicating that the item will certainly or almost certainly sell within a timeframe acceptable to the seller account), U is the log of the price and increases as the price increases. When P is below 1, the degree to which P falls below one is magnified for higher values of T, thus reducing the multiplier applied to the log of the price and reducing U. In some example embodiments, T is a constant (e.g., 1.1, 1.3, 1.5, or 2.0). In other example embodiments, T is selected from one of two values, depending on whether the seller account is identified as a consumer account or a business account. For example, T may be set to a higher value for a consumer account than for a business account, or vice versa. In still other example embodiments, T is generated based on preference data for the seller account, historical listing data for the seller account, or both.

In operation 940, the utility curve module 230 determines a recommended price for the item for the seller account, based on the utility curve for the item and the seller account. The recommended price may be the price that maximizes the utility value (e.g., the price indicated by the line 620 of the graph 600).

Figure 10:
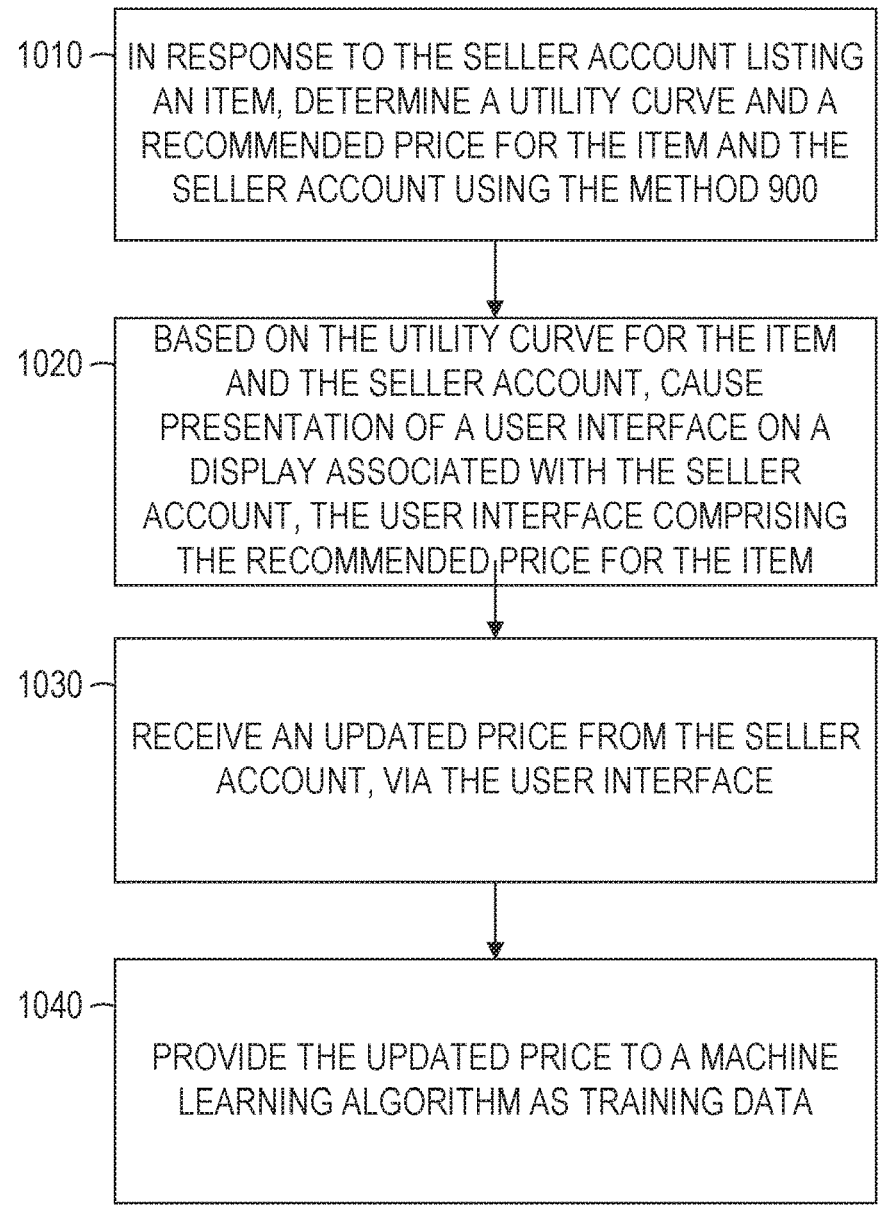
FIG. 10 is a flowchart illustrating operations of an e-commerce server in performing a method of utility-based price guidance, according to some example embodiments.

FIG. 10 is a flowchart illustrating operations of an e-commerce server in performing a method 1000 of utility-based price guidance, according to some example embodiments. The method 1000 includes operations 1010, 1020, 1030, and 1040. By way of example and not limitation, the method 1000 is described as being performed by the systems of FIG. 1 and the modules of FIG. 2.

In operation 1010, the e-commerce server 120, in response to the seller account listing an item for sale, determines a utility curve and a recommended price for the item and the seller account using the method 900. For example, after receiving a username and password to authenticate a user as having control over a seller account, the user interface module 250 may cause a user interface to be presented on the user's display, the user interface operable for the user to select an item for sale from a database of items, to enter a name and description of an item, to set a price for the item, or any suitable combination thereof. The listing of the item for sale by the seller account may be made available to buyer accounts at this time or after execution of operation 1030.

In operation 1020, the user interface module 250, based on the utility curve for the item and the seller account, causes presentation of a user interface on a display associated with the seller account, the user interface comprising a recommended price for the item. For example, the user interface 700 may be displayed on the user's device (e.g., a desktop computer, a laptop computer, a smart phone, a tablet, or other computing device connected to or including a display).

In operation 1030, the user interface module 250 receives an updated price from the seller account, via the user interface. For example, the user may interact with the button 780 to accept the recommended price for the item, use the price control 740 to select a different price, or any suitable combination thereof. The listing of the item for sale by the seller account may be generated with the updated price or modified to use the updated price if the listing was already created in operation 1010.

In operation 1040, the user interface module 250 provides the updated price to a machine learning algorithm as training data. Thus, the machine learning algorithm may update the preferences for the seller account based on the updated price, and future utility curves for the seller account may be modified based on the implicit feedback provided by the user.

Indeed, the methods and techniques disclosed herein have no real-world analogs. Brick-and-mortar sellers do not have a wealth of data available based on time to sell, so instead must undertake a slow trial-and-error process that leads to inefficiencies and lost profits. Moreover, there is only a blunt introduction of the notion of cost of time, for instance when a store is closing and an "everything must go" scenario results in extreme price cuts. Unlike the techniques disclosed herein, there is no nuanced consideration of the how subtle variations in price and cost of time can be incorporated to optimize seller utility.

Attempting to play the trial-and-error approach by e-commerce entities likewise wastes precious computational resources. Similar to the existing brick-and-mortar approaches, sellers are forced to make incremental changes to cost to identify price-demand sensitivity and cannot easily incorporate cost-of-time into selling considerations. Such an approach results in numerous and otherwise unnecessary listings being created and persisted, occupying important server memory and cluttering up the online marketplace with out-of-tune listings. The alternative for online sellers is to, again similar to the situations of brick-and-mortar sellers, hack away at the price with extreme discounts when cost of time becomes a factor. The technical consideration of the teachings provided herein provide an efficient solution to transcend the inefficiencies and crude approaches of the prior art.

According to various example embodiments, one or more of the methodologies described herein may facilitate efficient price setting of items listed for sale on an electronic marketplace. Hence, one or more of the methodologies described herein may facilitate applying prices to items without requiring the user to manually determine the market prices, expected time to sell, and probability of an item not selling at a particular price.

When these effects are considered in aggregate, one or more of the methodologies described herein may obviate a need for certain efforts or resources that otherwise would be involved in assigning prices to items. Efforts expended by a user in assigning prices may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Modules, Components, and Logic

Certain embodiments are described herein as including logic or a number of components, modules, or mechanisms. Modules may constitute either software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Software Architecture

Figure 11:
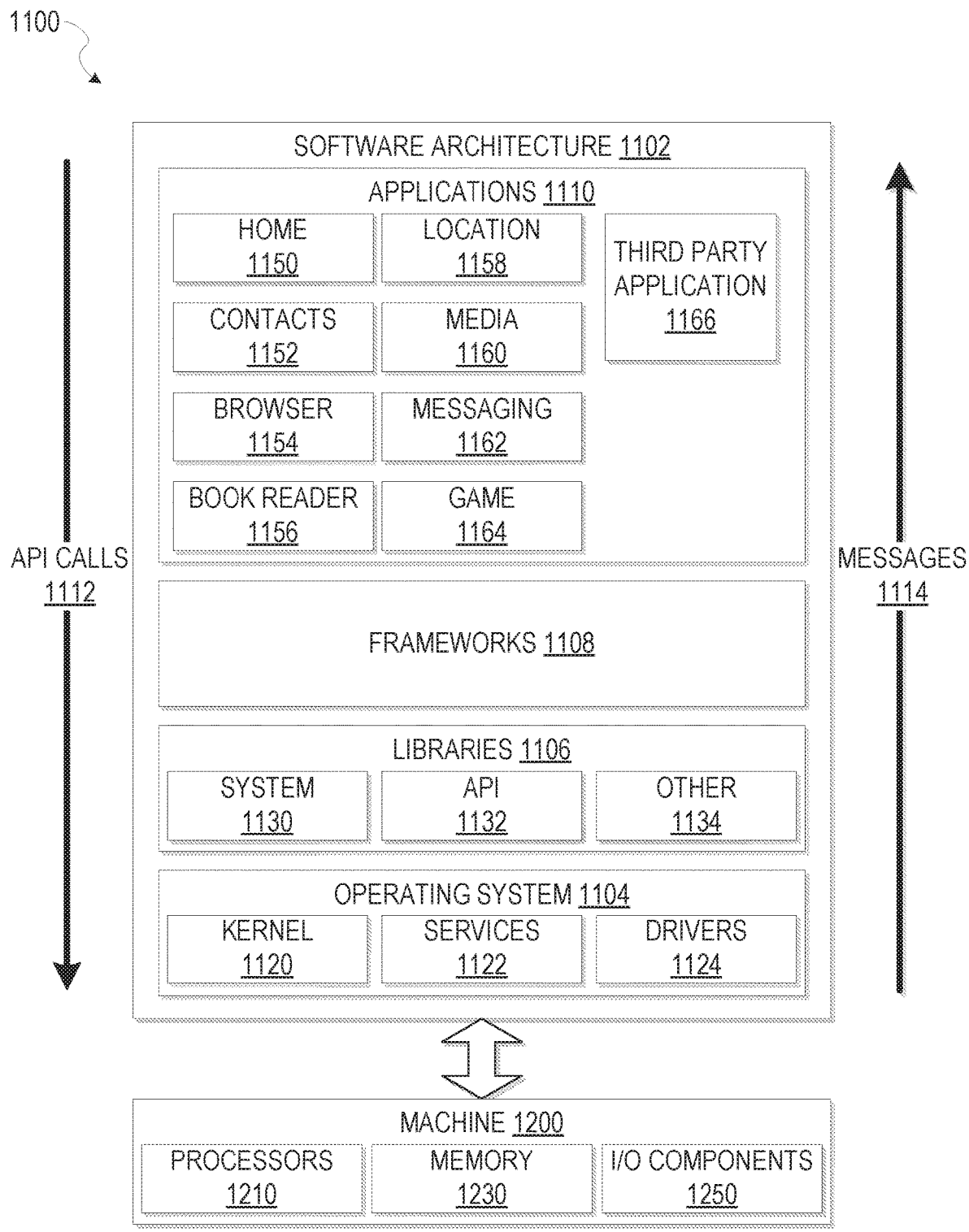
FIG. 11 is a block diagram illustrating an example of a software architecture that may be installed on a machine, according to some example embodiments.

FIG. 11 is a block diagram 1100 illustrating a software architecture 1102, which may be installed on any one or more of the devices described above. FIG. 11 is merely a non-limiting example of a software architecture, and it will be appreciated that many other architectures may be implemented to facilitate the functionality described herein. The software architecture 1102 may be implemented by hardware such as a machine 1200 of FIG. 12 that includes processors 1210, memory 1230, and input/output (I/O) components 1250. In this example, the software architecture 1102 may be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke API calls 1112 through the software stack and receive messages 1114 in response to the API calls 1112, according to some implementations.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers in some implementations. For example, the kernel 1120 provides memory management, processor management (e.g., scheduling), component management, networking, and security settings, among other functionality. The services 1122 may provide other common services for the other software layers. The drivers 1124 may be responsible for controlling or interfacing with the underlying hardware. For instance, the drivers 1124 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 1106 provide a low-level common infrastructure that may be utilized by the applications 1110. The libraries 1106 may include system libraries 1130 (e.g., C standard library) that may provide functions such as memory allocation functions, string manipulation functions, mathematic functions, and the like. In addition, the libraries 1106 may include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1106 may also include a wide variety of other libraries 1134 to provide many other APIs to the applications 1110.

The frameworks 1108 provide a high-level common infrastructure that may be utilized by the applications 1110, according to some implementations. For example, the frameworks 1108 provide various graphic user interface (GUI) functions, high-level resource management, high-level location services, and so forth. The frameworks 1108 may provide a broad spectrum of other APIs that may be utilized by the applications 1110, some of which may be specific to a particular operating system or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third-party application 1166. According to some embodiments, the applications 1110 are programs that execute functions defined in the programs. Various programming languages may be employed to create one or more of the applications 1110, structured in a variety of manners, such as object-orientated programming languages (e.g., Objective-C, Java, or C++) or procedural programming languages (e.g., C or assembly language). In a specific example, the third-party application 1166 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1166 may invoke the API calls 1112 provided by the mobile operating system (e.g., the operating system 1104) to facilitate functionality described herein.

Example Machine Architecture and Machine-Readable Medium

Figure 12:
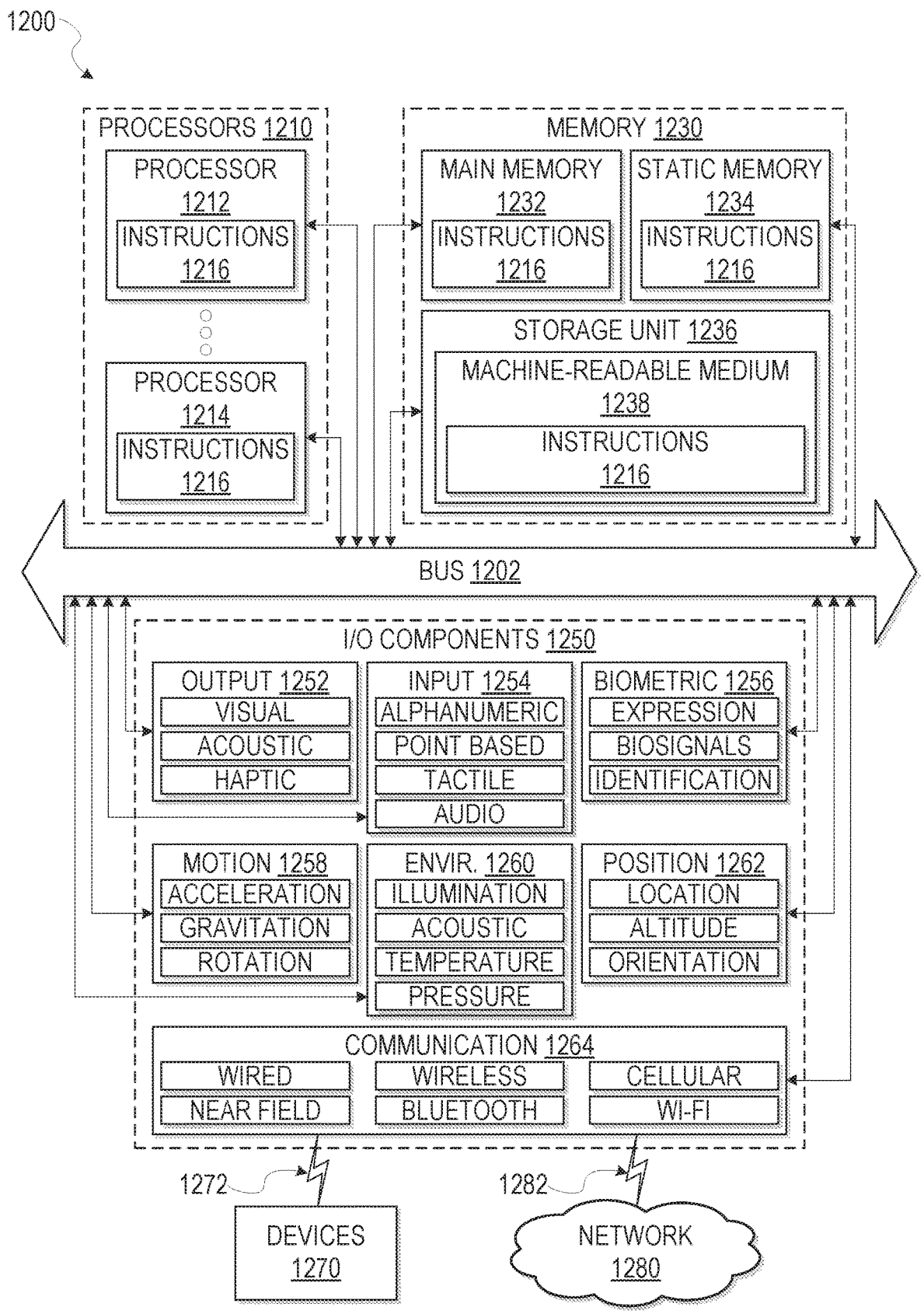
FIG. 12 is a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1212 and a processor 1214 that may execute the instructions 1216. The term "processor" is intended to include multi-core processors that may comprise two or more independent processors (also referred to as "cores") that may execute instructions contemporaneously. Although FIG. 12 shows multiple processors, the machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1236 accessible to the processors 1210 via the bus 1202. The storage unit 1236 may include a machine-readable medium 1238 on which are stored the instructions 1216 embodying any one or more of the methodologies or functions described herein. The instructions 1216 may also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various implementations, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown in an example embodiment to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine (e.g., processors 1210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 include output components 1252 and input components 1254. The output components 1252 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, the communication components 1264 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, in some implementations, the communication components 1264 detect identifiers or include components operable to detect identifiers. For example, the communication components 1264 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 1264, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 as "non-transitory" should not be construed to mean that the medium is incapable of movement, the medium should be considered as being transportable from one physical location to another. Additionally, since the machine-readable medium 1238 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of training a machine learning algorithm, the method comprising:

determining, by one or more processors, a price curve for an item, the price curve indicating a probability of sale of the item at each of a plurality of prices;

determining, by the one or more processors, a preference for a seller account based on completed listings of items for sale by the seller account, the preference indicating a cost of time and the determining of the preference for the seller account comprises providing the completed listings of items for sale by the seller account as training data to the machine learning algorithm, the machine learning algorithm being trained with the training data to determine preferences for the seller account;

based on the price curve for the item and the cost of time, determining, by the trained machine learning algorithm, a utility curve for the item and the seller account, the utility curve indicating a sales volume for a seller associated with the seller account for listing an item as a function of price of the item, the utility curve including a price threshold above which a likelihood of the seller selling the item at a first price above the price threshold decreases and the likelihood of the seller selling the item at a second price below the price threshold increases;

based on the utility curve for the item and the seller account, using the trained machine learning algorithm to present a first user interface on a display associated with the seller account, the first user interface comprising:

a slider that corresponds to the utility curve;

a control configurable to be moved by the seller along the slider;

a price range that includes a recommended price for the item to be sold from the seller account shown on the slider such that a seller moves the control along the price range;

an option to generate a listing of the item for sale at the recommended price based on the seller using the control to set the item at one of the first price or the second price; and an amount of increased likelihood of selling the item at the first price in comparison to the second price, the control being configurable to move to different positions along the slider where the amount of increased likelihood of selling the item at the first price in comparison to the second price varies based on the different positions of the control along the slider and the trained machine learning algorithm is used to provide the recommended price based on the utility curve;

receiving an input corresponding to moving the control to one of the different positions along the slider; and presenting a second user interface in response to receiving the input, the second user interface displaying an updated likelihood of the seller selling the item in response to the movement of the control to the one of the different positions along the slider.

2. The method of claim 1, wherein the determining of the utility curve for the item and the seller account is further based on a preference for a period of time to sell for the seller account.

3. The method of claim 2, wherein the price curve for the item indicates the probability of sale of the item within the period of time to sell at each of the plurality of prices.

4. The method of claim 1, further comprising:
detecting a selection of the option; and
in response to the detection of the selection of the option, generating the listing of the item for sale at the recommended price.

5. The method of claim 1, wherein the determining of the price curve for the item comprises determining an area under a receiver operating characteristic curve.

6. The method of claim 1, wherein the user interface comprises an informational message that provides information related to the utility curve for the seller account.

7. The method of claim 6, further comprising:
in response to adjustment of the slider:
updating the user interface to indicate a price corresponding to the position of the slider; and
updating the informational message to indicate the amount of increased likelihood of selling the item at the price corresponding to the position of the slider.

8. The method of claim 1, wherein the second user interface includes a prompt to provide the preference for the seller account and the method further comprises
receiving, via the second user interface, the preference for the seller account.

9. A machine learning system comprising:
a memory that stores instructions; and
one or more processors configured by the instructions to perform operations comprising:
determining a price curve for an item, the price curve indicating a probability of sale of the item at each of a plurality of prices;
determining a preference for a seller account based on completed listings of items for sale by the seller account, the preference indicating a cost of time and the determining of the preference for the seller account comprises providing the completed listings of items for sale by the seller account as training data to a machine learning algorithm, the machine learning algorithm being trained with the training data to determine preferences for the seller account;

based on the price curve for the item and the preference for the seller account, determining by the trained machine learning algorithm, a utility curve for the item and the seller account, the utility curve indicating sales volume for a seller associated with the seller account as a function of price of the item, the utility curve including a price threshold above which a likelihood of the seller selling the item at a first price above the price threshold decreases and the likelihood of the seller selling the item at a second price below the price threshold increases;

based on the utility curve for the item and the seller account, using the trained machine learning algorithm to present a first user interface on a display associated with the seller account, the first user interface comprising:

a slider that corresponds to the utility curve;
a control configurable to be moved by the seller along the slider;
a price range that includes a recommended price for the item to be sold from the seller account shown on the slider such that a seller moves the control along the price range;
an option to generate a listing of the item for sale at the recommended price based on the seller using the control to set the item at one of the first price or the second price; and
an amount of increased likelihood of selling the item at the first price in comparison to the second price, the control being configurable to move to different positions along the slider where the amount of increased likelihood of selling the item at the first price in comparison to the second price varies based on the different positions of the control along the slider and the trained machine learning algorithm is used to provide the recommended price based on the utility curve,
receiving an input corresponding to moving the control to one of the different positions along the slider; and
presenting a second user interface in response to receiving the input, the second user interface displaying an updated likelihood of the seller selling the item in response to the movement of the control to the one of the different positions along the slider.

10. The system of claim 9, wherein the determining of the utility curve for the item and the seller account is further based on a preference for a period of time to sell for the seller account.

11. The system of claim 10, wherein the price curve for the item indicates the probability of sale of the item within the period of time to sell at each of the plurality of prices.

12. The system of claim 9, wherein the operations further comprise:
detecting a selection of the option; and
in response to the detection of the selection of the option, generating the listing of the item for sale at the recommended price.

13. A non-transitory machine-readable medium that stores instructions that, when executed by one or more processors, cause the one or more processors to perform operations comprising:

determining a price curve for an item, the price curve indicating a probability of sale of the item at each of a plurality of prices;

determining a preference for a seller account, based on completed listings of items for sale by the seller account, the preference indicating a cost of time and the determining of the preference for the seller account comprises providing the completed listings of items for sale by the seller account as training data to a machine learning algorithm, the machine learning algorithm being trained with the training data to determine preferences for the seller account;

based on the price curve for the item and the preference for the seller account, determining by the trained machine learning algorithm, a utility curve for the item and the seller account, the utility curve indicating sales volume for a seller associated with the seller account as a function of price of the item, the utility curve including a price threshold above which a likelihood of the seller selling the item at a first price above the price threshold decreases and the likelihood of the seller selling the item at a second price below the price threshold increases;

based on the utility curve for the item and the seller account, using the trained machine learning algorithm to present causing presentation of a first user interface on a display associated with the seller account, the first user interface comprising:
 a slider that corresponds to the utility curve;
 a control configurable to be moved by the seller along the slider;
 a price range that includes a recommended price for the item to be sold from the seller account shown on the slider such that a seller moves the controller along the price range;
  an option to generate a listing of the item for sale at the recommended price based on the seller using the control to set the item at one of the first price or the second price; and
  an amount of increased likelihood of selling the item at the first price in comparison to the second price, the control being configurable to move to different positions along the slider where the amount of increased likelihood of selling the item at the first price in comparison to the second price varies based on the different positions of the control along the slider and the trained machine learning algorithm is used to provide the recommended price based on the utility curve;

receiving an input corresponding to moving the control to one of the different positions along the slider; and presenting a second user interface in response to receiving the input, the second user interface displaying an updated likelihood of the seller selling the item in response to the movement of the control to the one of the different positions along the slider.

* * * * *